(12) United States Patent
Vemula et al.

(10) Patent No.: US 7,415,549 B2
(45) Date of Patent: Aug. 19, 2008

(54) DMA COMPLETION PROCESSING MECHANISM

(75) Inventors: Kiran Vemula, Worcester, MA (US); Victor Lau, Marlboro, MA (US); Pak-lung Seto, Shrewsbury, MA (US); Nai-Chih Chang, Shrewsbury, MA (US); William Halleck, Lancaster, MA (US); Suresh Chemudupati, Marlborough, MA (US); Ankit Parikh, Grafton, MA (US); Gary Y. Tsao, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 325 days.

(21) Appl. No.: 11/237,455

(22) Filed: Sep. 27, 2005

(65) Prior Publication Data

US 2007/0073921 A1 Mar. 29, 2007

(51) Int. Cl.
*G06F 13/28* (2006.01)
*G06F 13/00* (2006.01)
(52) U.S. Cl. .......................... 710/22; 710/33
(58) Field of Classification Search .................. 710/22
See application file for complete search history.

(56) References Cited

U.S. PATENT DOCUMENTS

| | | | |
|---|---|---|---|
| 6,108,713 A | 8/2000 | Sambamurthy et al. | |
| 6,782,465 B1 * | 8/2004 | Schmidt | 711/208 |
| 7,047,533 B2 | 5/2006 | Circenis | |
| 7,225,278 B1 * | 5/2007 | Baxter et al. | 710/22 |
| 2004/0019835 A1 | 1/2004 | Marisetty et al. | |
| 2005/0034045 A1 | 2/2005 | Lueck et al. | |
| 2005/0076164 A1 * | 4/2005 | Malalur | 710/22 |
| 2005/0135421 A1 | 6/2005 | Chang et al. | |
| 2005/0154946 A1 | 7/2005 | Mitbander et al. | |
| 2005/0268136 A1 | 12/2005 | Kostadinov et al. | |
| 2007/0002827 A1 | 1/2007 | Lau et al. | |
| 2007/0011333 A1 | 1/2007 | Lau et al. | |
| 2007/0011548 A1 | 1/2007 | Chemudupati et al. | |
| 2007/0073947 A1 | 3/2007 | Lau et al. | |
| 2007/0074062 A1 | 3/2007 | Chang et al. | |

OTHER PUBLICATIONS

Hallack-STampler, "Definition of Managed Objects for SCSI Entities" IETF Standard-working-draft, Internet Engineering Taks Force IETF, CH, vol. ips, No. 7, July p. 5, line 4-9, line 6; figures 1-3.
Krueger, "T1 Network Address Authority (NAA) Naming Format for iSCSI Node Names" IETF Standard, Internet Engineering Task Force, IETF, CH, Feb. 2005, p. 4, line 19-p. 5, line 6.

(Continued)

*Primary Examiner*—Henry Tsai
*Assistant Examiner*—Kris Rhu
(74) *Attorney, Agent, or Firm*—Christopher K. Gagne

(57) ABSTRACT

According to one embodiment, a storage device is disclosed. The storage device includes a port having one or more lanes and a direct memory access (DMA) Descriptor Manager (DM). The DM generates and tracks completion of descriptors. The DM includes a first completion lookup table to track one or more fields of an input/output (I/O) context received at a first lane.

18 Claims, 7 Drawing Sheets

OTHER PUBLICATIONS

Maxtor Corporation: "SAS-1.1, ST_T (transport layer for SSP target ports) state machines" Jul. 12, 2004, T10 Technical Committee, XP002407724, Retrieved from the Internet: URL: http://www.t10.org/ftp/t10/document.04/04-137r2.pdf, paragraph [9.2.6.3.3.5.1].

"Non-Final Office Action for U.S. Appl. No. 11/237,448 Mailed on Feb. 4, 2008, 10 Pages."

"Response to Non-Final Office Action for U.S. Appl. No. 11/237,448, filed Apr. 4, 2008, 14 Pages."

"Non-Final Office Action for U.S. Appl. No. 11/165,725 Mailed on Mar. 17, 2008, 10 Pages."

"Non-Final Office Action for U.S. Appl. No. 11/237,454 Mailed on May 22, 2007, 17 Pages."

"Response to Non-Final Office Action for U.S. Appl. No. 11/237,454, filed Jul. 10, 2007, 10 Pages."

"Final Office Action for U.S. Appl. No. 11/237,454 Mailed on Aug. 17, 2007, 18 Pages."

"Response to Final Office Action for U.S. Appl. No. 11/237,454, filed Oct. 23, 2007, 10 Pages."

"Non-Final Office Action for U.S. Appl. No. 11/237,454 Mailed on Dec. 19, 2007, 15 Pages."

"Response to Non-Final Office Action for U.S. Appl. No. 11/237,454, filed Mar. 3, 2008, 12 Pages."

* cited by examiner

| IOCI | Lane 0 Rx LUT | Completion Status |
|---|---|---|
| 1 | A_XC, A_RO, A_SGL_PTR, A_AL, S_SGL_PTR, S_AL – Descr 1 | Wait |
| 2 | A_XC, A_RO, A_SGL_PTR, A_AL, S_SGL_PTR, S_AL – Descr 2 | Wait |
| 1 | A_XC, A_RO, A_SGL_PTR, A_AL, S_SGL_PTR, S_AL – Descr 3 | Done |
| 3 | A_XC, A_RO, A_SGL_PTR, A_AL, S_SGL_PTR, S_AL – Descr 1 | Wait |

| IOCI | Lane 2 Rx LUT | Completion Status |
|---|---|---|
| 1 | A_XC, A_RO, A_SGL_PTR, A_AL, S_SGL_PTR, S_AL – Descr 2 | Wait |
| 2 | A_XC, A_RO, A_SGL_PTR, A_AL, S_SGL_PTR, S_AL – Descr 3 | Done |
| 1 | A_XC, A_RO, A_SGL_PTR, A_AL, S_SGL_PTR, S_AL – Descr 4 | Wait |
| 2 | A_XC, A_RO, A_SGL_PTR, A_AL, S_SGL_PTR, S_AL – Descr 1 | Wait |

Figure 8

DMA COMPLETION PROCESSING MECHANISM

FIELD OF THE INVENTION

The present invention relates to computer systems; more particularly, the present invention relates to computer system interaction with storage systems.

BACKGROUND

Serial attached storage protocols, such as serial ATA (SATA) and serial Small Computer System Interface (SCSI) (SAS) are becoming more prevalent for connecting storage devices to a computer system. In computer systems implementing such serial storage devices, one storage device in the system may communicate with others. For example, a device requesting data (referred to as the initiator device) may receive data from a target device.

A storage device typically includes a direct memory access (DMA) Descriptor Manager (DM) to manage DMA transfers by generating descriptors and keeping track of I/O execution based on requests. Functionality involved within the DMA descriptor manager (e.g., I/O context creation, Rx frame processing, descriptor generation, completion status tracking and updating the I/O context) is managed by firmware. Using firmware to implement such functions results in having to use a relatively large quantity of processing cycles.

BRIEF DESCRIPTION OF THE DRAWINGS

The invention is illustrated by way of example and not limitation in the figures of the accompanying drawings, in which like references indicate similar elements, and in which:

FIG. 8 illustrates one embodiment of a completion lookup table pool.

DETAILED DESCRIPTION

A hardware assisted DMA completion processing mechanism is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
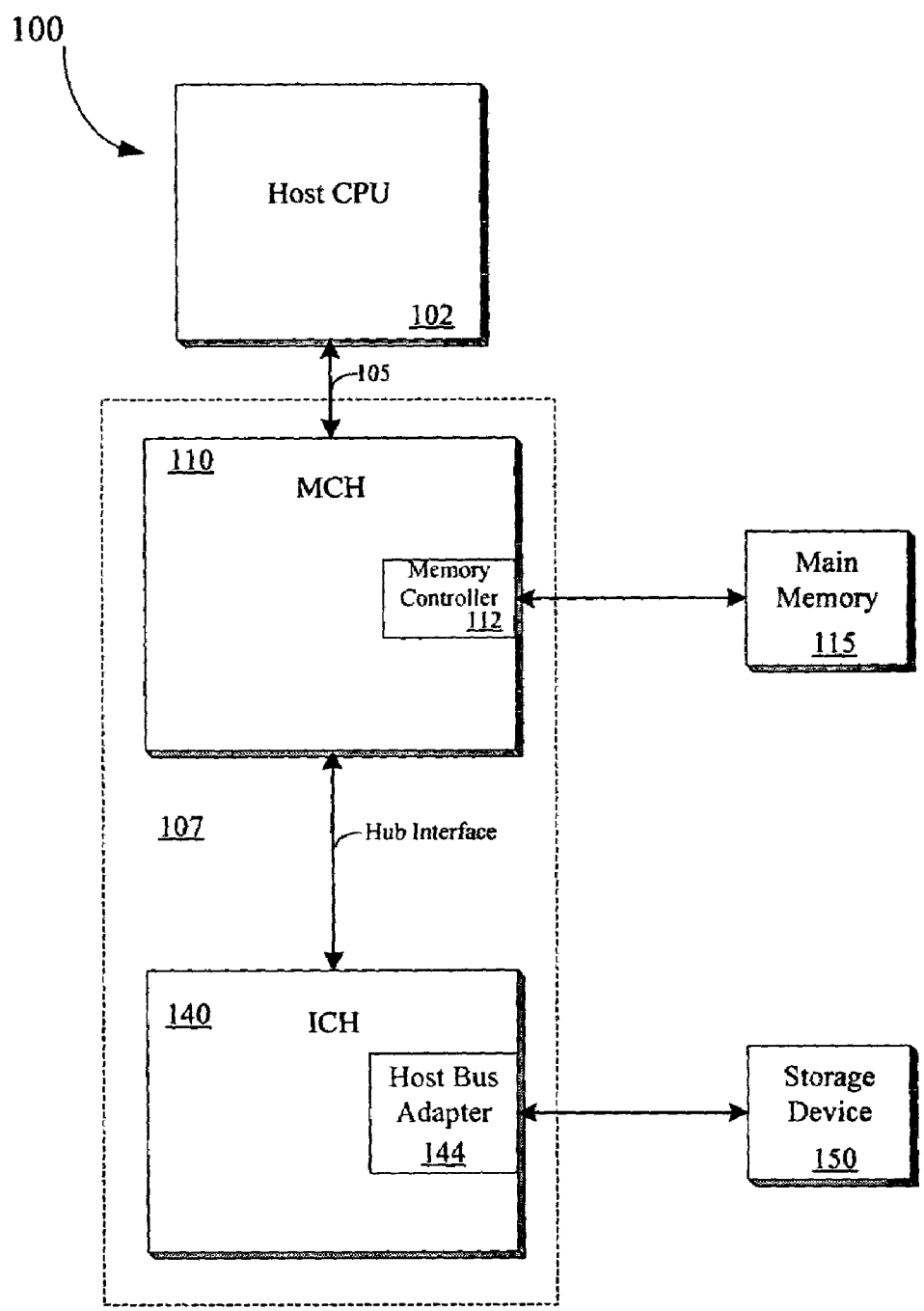
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more storage devices 150. In one embodiment, storage device 150 is a serial SCSI (SSP) drive. However in other embodiments, storage device 150 may be implemented as other serial protocols.

Figure 2:
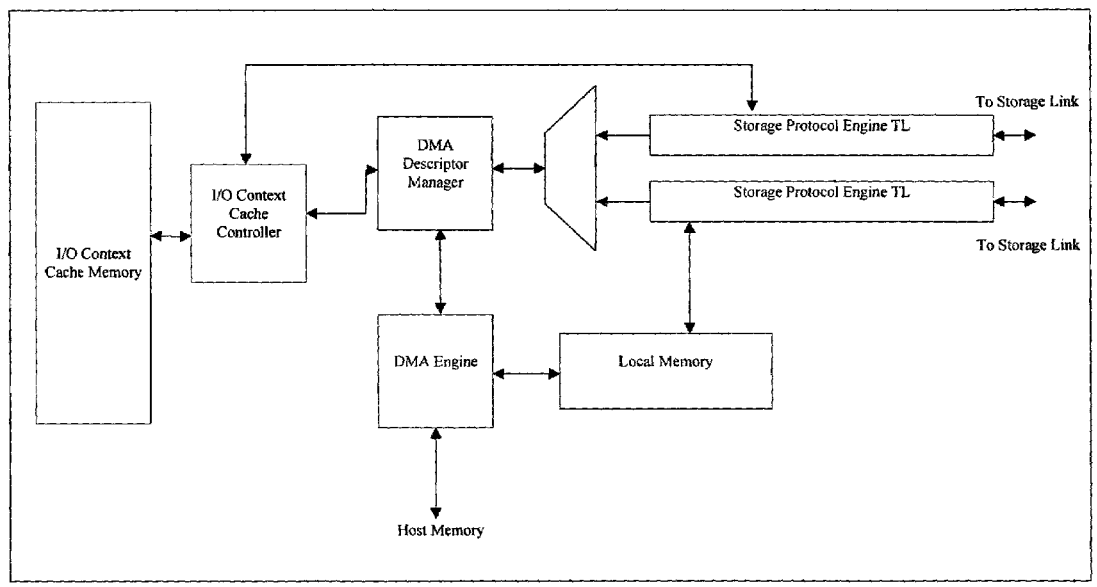
FIG. 2 illustrates a conventional storage controller.

According to one embodiment, HBA 144 includes a storage controller. A storage controller includes one or more storage links with corresponding transport layers (TL's) that process input/output (I/O) control and data frames both on the transmission (Tx) and receiver (Rx) sides. FIG. 2 illustrates a conventional storage controller.

Referring to FIG. 2, the storage controller includes one or more storage links along with corresponding transport layers (TL's) that process the I/O control and data frames both on the Tx and Rx sides. A direct memory access (DMA) engine transfers data to and from data buffers in the TL's from and to a host or external memory as programmed by a DMA Descriptor Manager (DM).

The DM generates the descriptors and keeps track of their execution based on the requests made by either the TxTL or the RxTL. The descriptor information makes a data set self-documenting. For instance, each data set can supply the attributes of the data set and of its variables. Thus, once data is in the form of a data set, the attributes of the data set or the variables in program statements do not have to be specified. The information is obtained directly from the data set. Descriptor information includes the number of observations, the observation length, the date that the data set was last modified, and other facts. Descriptor information for individual variables includes attributes such as name, type, length, format, label, and whether the variable is indexed.

The storage controller also includes an I/O context cache controller and an I/O context cache memory. Typically, the DMA engine works on several DMA work queues, usually of varying priorities. The data being moved is initiated by setting up work entries (define) in the DMA work queue.

Figure 3:
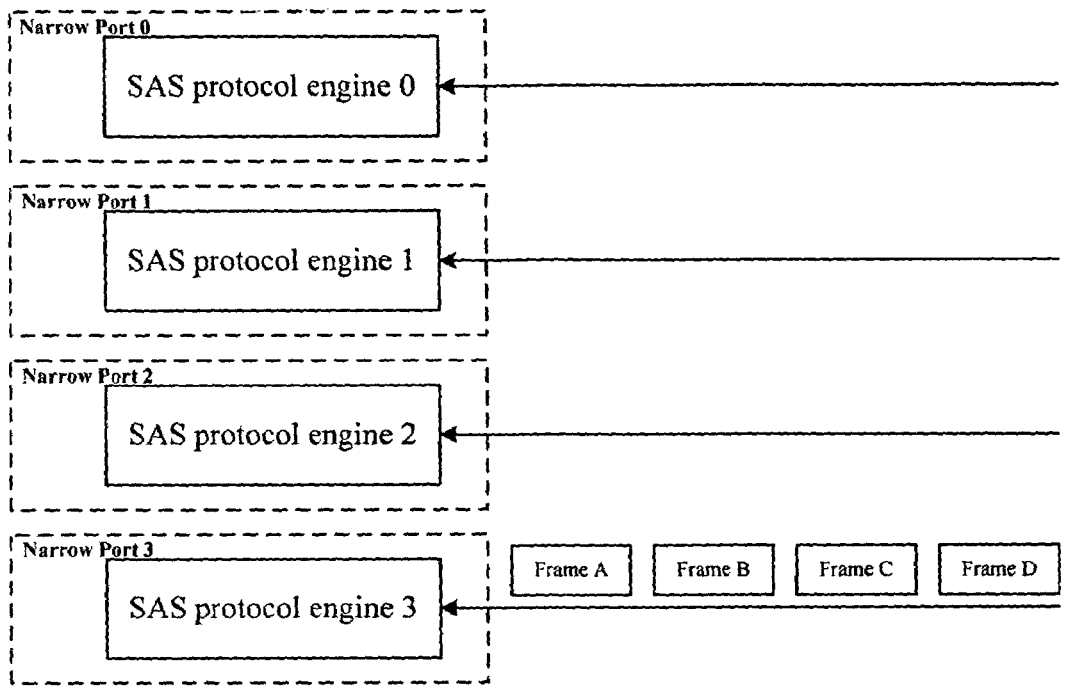
FIG. 3 illustrates an exemplary narrow port operation.

For a SAS narrow port operation, all data frames for a given I/O have an I/O context and are guaranteed to arrive on the same lane in a port, see FIG. 3. When the storage protocol engine receives a frame, a receive path of the transport layer (RxTL) requests an I/O context for that sequence from an I/O context cache controller which then searches for the I/O context (IOC) in the context cache.

If the IOC is not in the context cache, the I/O context cache controller fetches the I/O context from a context memory (e.g., a local static random access memory (SRAM) or in host memory 115). If the RxTL decides that the received data frame needs to be moved, the RxTL makes a request to a DMA descriptor manager for generation of descriptors for a DMA engine's work queue and provides the appropriate fields of the I/O context along with the request. Subsequently, the data is drained out of an Rx first in first out (FIFO).

The above sequence is repeated for each frame that is received on a particular lane. If the storage link is a narrow SAS port or direct attached port such as SATA port and the sub-sequent frames received belong to the same I/O sequence, and if there is no "memory" of the I/O context within the RxTL, the I/O context cache controller may end up fetching the same I/O context for every frame. As a result, total I/O processing time is added and the device suffers decreased performance.

Further, in the DMA engine, if there are sufficient entries in the work queue, with each entry being capable of handling a single descriptor, the DMA engine may process the descriptors in the order they were written into the work queue. On the other hand, if the DMA engine has multiple smaller work queues and the DMA engine splits the big DMA transaction into multiple smaller transactions and issues them on different work queues, the transactions may be completed out-of-order. Consequently, the completion statuses of the descriptors generated by the DM to drain the data out of the Rx FIFO in the RxTL may also be received in any order.

Figure 4:
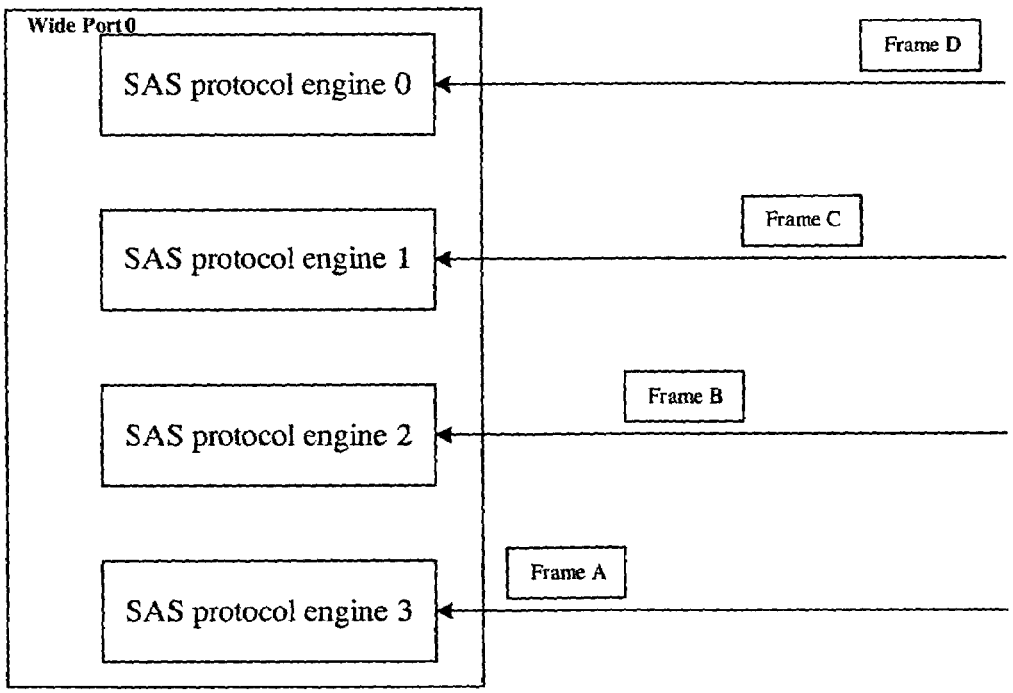
FIG. 4 illustrates an exemplary wide port operation.

In a SAS wide port configuration, multiple lanes may be connected to the same target device at the same time, see FIG. 4. Instead of all data frames for a single I/O arriving on the same lane, the data frames may be spread across multiple lanes in the wide port (e.g., lane-hopping). In this case, each lane retrieves the same I/O context before processing a frame in sequential order (assuming A, B, C, D are all frames from the same I/O). As each frame is processed, the I/O context is updated, and the next frame is processed using the modified/updated values. Accordingly, the I/O context is migrated from lane to lane in order as the I/O proceeds.

Thus for the wide-port with lane-hopping scenario, the lane processing the Frame B waits until it receives the latest I/O context, which happens to be owned by the lane processing Frame A, and the lane writes back the "leading" or "speculative" fields of the I/O context to the context memory. The DMA descriptor manager fetches the I/O context that was just written back for the lane processing Frame B to use. At that point the Frame B can be processed by the DM. Similarly, the above steps are followed to process Frame C, Frame D and all the sub-sequent frames belonging to the sequence. This method adds significant read/write overhead to the processing time of the I/O.

According to one embodiment, a completion lookup table is provided within the DM to efficiently process I/O at a storage controller. Particularly, the completion lookup table tracks various fields of an I/O context, one per lane, having an entry for each outstanding descriptor, populated with all relevant I/O context fields. Thus, the completion lookup table enables the updating of "lagging" or "actual" values of fields indexed with an I/O Context Index (IOCI) for that particular lane.

Figure 5:
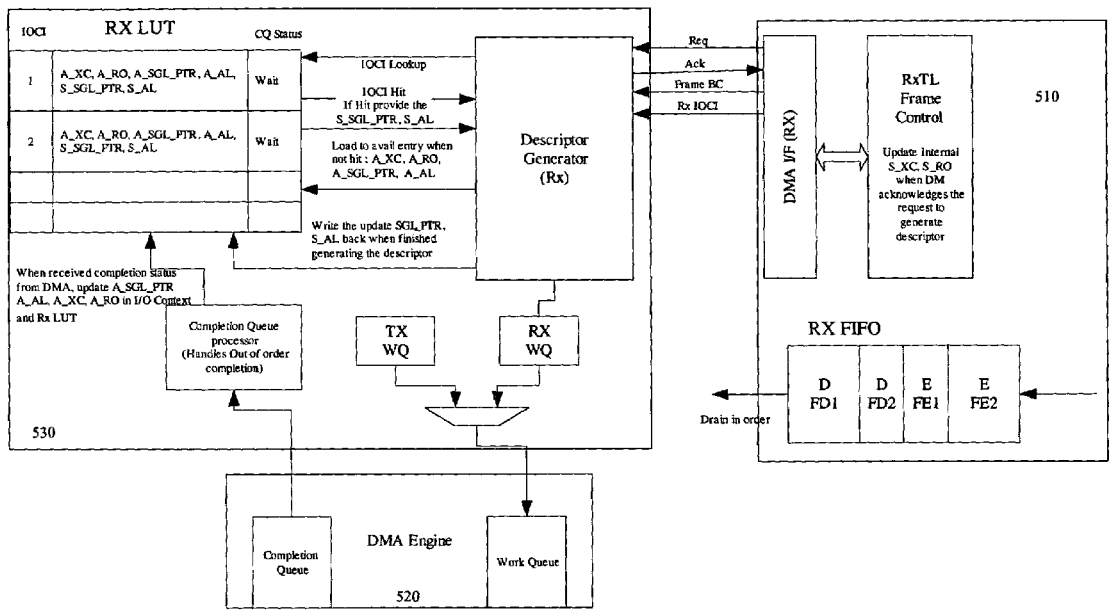
FIG. 5 illustrates another embodiment of a storage controller.

FIG. 5 illustrates one embodiment of a storage controller for receiving frames in a narrow port application. The storage controller includes RxTL 510, DMA engine 520 and DM 530. As shown in FIG. 5, DM 530 includes a completion lookup table having several entries. In one embodiment, there is an entry for each outstanding descriptor that is generated based on requests from the RxTL 510.

In a further embodiment, each entry in the table is indexed by a unique I/O Context Index (IOCI). An IOCI includes initial I/O Read/Write information, created by firmware, which passes to the transport layer and relevant dynamic fields. IOCI are maintained by both the transport layer and DM 530, which generates and tracks the completion of descriptors to keep track of the current I/O process. Table 1 below shows one embodiment of the Rx I/O Context fields.

TABLE 1

1. S_XC
2. S_RO
1. A_XC
2. A_RO
3. A_SGL_PTR
4. A_AL
1. S_SGL_PTR
2. S_AL

RxTL 510 updates the top set of fields when DMA 520 acknowledges its request to generate the descriptor to drain data from the Rx buffer to the host (e.g., memory 115) or local memory in the storage controller. DM 530 updates the middle set of fields when it receives the completion status from DMA engine 520. Further, DM 530 updates the bottom set of fields when it generates a descriptor and writes to the work queue in the DMA engine 520.

Figure 6:
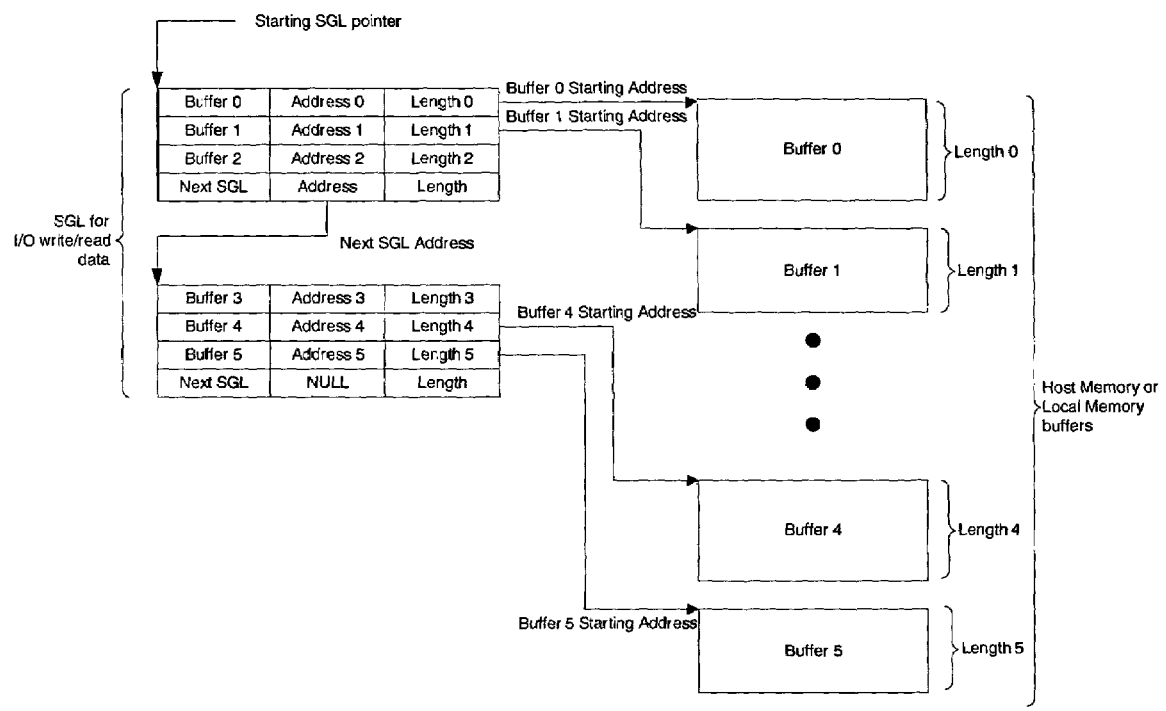
FIG. 6 illustrates one embodiment of a Scatter Gather List.

Referring back to FIG. 5, the lookup table entries are populated by several I/O context fields shown above in Table 1 (e.g., the "actual" or "lagging" fields) like Transfer Count (A_XC), Relative Offset within the buffer (A_RO), pointer to a Scatter/Gather List (A_SGL_PTR), Address/Length pair (A_AL) and "speculative" or "leading" fields like S_SGL_PTR and S_AL. FIG. 6 illustrates one embodiment of a SGL. The SGL may be stored in either local or host memory.

Referring back to FIG. 5, whenever RxTL 510 has some frames to process and is to drain the data from the Rx buffers within the storage protocol engine, RxTL 510 requests DM 530 to generate descriptors and supplies DM 530 with the corresponding IOCI and all of the relevant I/O context fields. The leading fields are updated by the DM 530 whenever DM 530 has completed generating a descriptor and has written the work queue entry within DMA engine 520. The "lagging" or "actual" values are updated again by DM 530, whenever the completion status is received from DMA engine 520 for that particular IOCI. When a transfer count is exhausted and the completion status is received, the entry is invalidated and is available for next descriptor to use.

Figure 7:
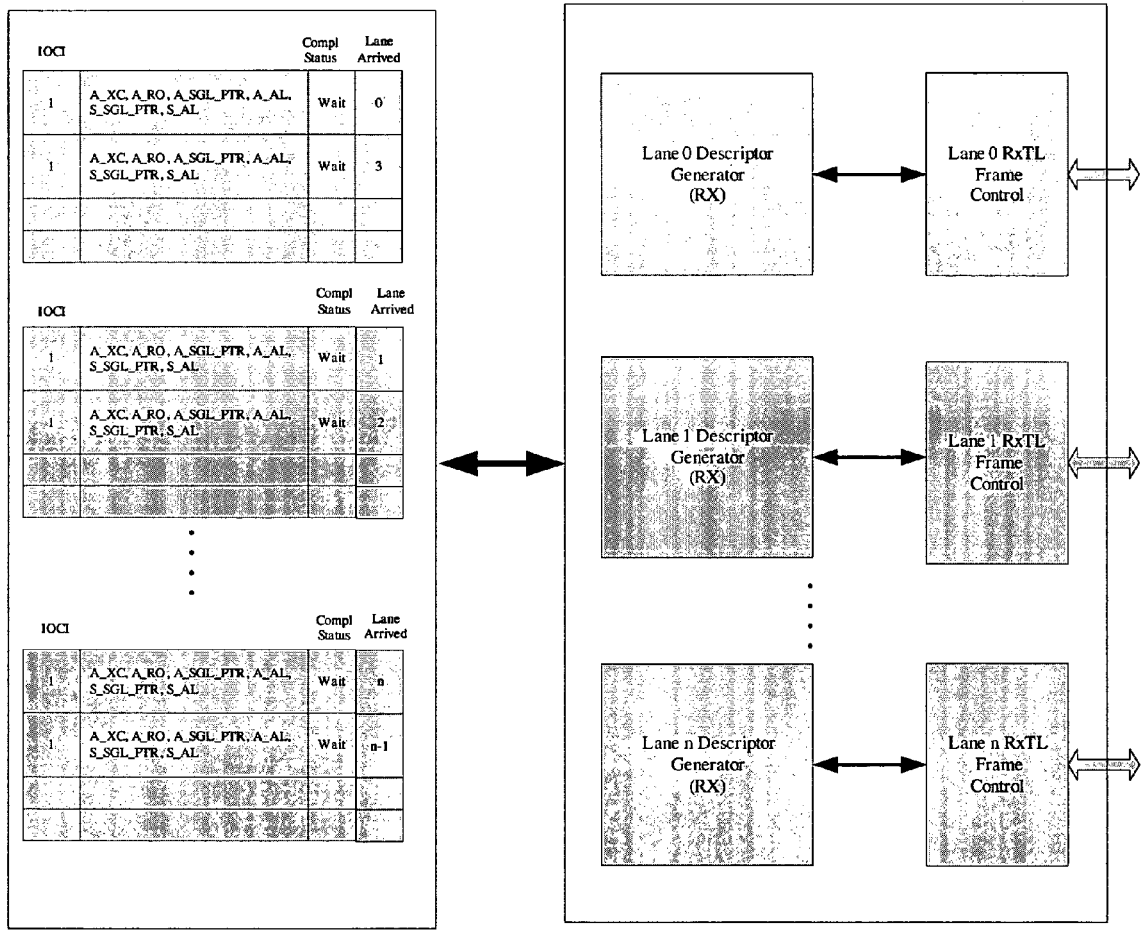
FIG. 7 illustrates yet another embodiment of a storage controller.

According to one embodiment, the wide-port problem with lane-hopping is resolved by sharing the Rx completion lookup tables of all the lanes within that wide port, thus creating a "pool" of completion lookup tables. FIG. 7 illustrates one embodiment of a storage controller implementing wide-port pool of completion look-up-tables.

The sharing of the Rx completion lookup tables enables DM 530 to have access to the appropriate I/O context fields, even in the case of lane-hopping where the frames belonging to a single I/O can be received on any lane within the wide port. Consequently, the table lists all of the outstanding descriptors for all of the lanes within the wide-port.

This also allows access to multiple outstanding descriptors, all belonging to the same I/O sequence, waiting on the completion status from DMA engine 520. The order of the DMA completions is maintained by marking each entry in the table when a corresponding completion status is received, and by retiring the entries when all of the descriptors that were issued earlier than the particular entry have been completed.

Thus, if the completion status of a descriptor is received out-of-order, meaning there are entries in the table belonging to that same I/O sequence waiting for completion, that particular entry is simply marked as complete, and it is neither retired from the table nor are the contents written to the context memory.

FIG. 8 illustrates one embodiment of a more detailed view of the completion lookup table pool. As shown in FIG. 8, there are four outstanding descriptors each in lane 0 and lane 2. Though the status of Descriptor 3 of IOCI 1 is "Done", the I/O may not be considered done and may not be "retired" from the table because the two descriptors that were issued earlier (e.g., Descriptor 1 and Descriptor 2 of IOCI 1) have "Wait" status. Similarly, Descriptor 1 and Descriptor 2 of the IOCI 2 with "Wait" status can not be retired even though the Descriptor 3 of the IOCI 2 has "Done" status in the CLUT in lane 2.

The above-described DMA descriptor manager having an Rx completion lookup table (or pool of completion lookup tables in the wide port case) reduces total I/O processing time and performance of a storage controller. In particular, the completion lookup table allows the processing time of all subsequent data frames belonging to an I/O sequence to be cut short by providing the latest and up-to-date context values for the descriptor generation. This feature allows the DM to have access to the up-to-date, "leading" values of the relevant fields of the context and eliminates the need for DMA descriptor manager to write back those fields after processing each frame and then to fetch the same fields again for every frame in that I/O sequence received from memory.

In addition, the completion lookup table allows the DMA descriptor manager to handle the return of completion status from a DMA engine in any order. Further, the DMA descriptor manager has access to the "leading" values of some of the fields of the I/O context regardless of which lane within the wide-port recently updated the values. Thus, having a pool of completion lookup tables shared among all lanes in a wide-port application eliminates the potential blocking of frames that might result when a lane is looking for the current values of the I/O context that are owned by another lane in the wide-port.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A storage controller comprising: a port having a plurality of lanes capable of propagating I/O data corresponding to a plurality of different contexts; and a direct memory access (DMA) Descriptor Manager (DM) to generate and track execution of descriptors, the DM having a plurality of completion lookup tables associated with the plurality of lanes, a first completion lookup table included in the plurality of lookup tables including: a first entry indexed by a first input/output (I/O) Context Index (IOCI) associated with a first descriptor having a first set of I/O context fields to track first I/O data corresponding to a first I/O context received at a first lane of the plurality of lanes; and a second completion lookup table included in the plurality of lookup tables including: a second entry indexed by a second IOCI associated with a second descriptor having a second set of I/O context fields to track second I/O data corresponding to the first I/O context received via a second lane of the plurality of lanes.

2. The storage controller of claim 1 wherein each entry includes initial I/O read/write information.

3. The storage controller of claim 1 wherein the first set of I/O context fields include one or more of a transfer count relative offset within a buffer, pointer to a scatter/gather list and address/length pair.

4. The storage controller of claim 1 wherein the first completion lookup table enables updating of actual field values indexed with the IOCI for the first lane.

5. The storage controller of claim 1 further comprising: a DMA engine coupled to the DM; and a storage protocol engine.

6. The storage controller of claim 1 wherein a second completion lookup table includes a third entry to track third I/O data corresponding to a second I/O context received at the second lane, the first and second I/O contexts being different from each other.

7. The storage controller of claim 6 wherein the first and second completion lookup tables form a pool of tables that is shared to enable the DM to have access to I/O context fields for I/O received at both the first and the second lanes.

8. The storage controller of claim 7 wherein an order of DMA completions is maintained by marking a certain entry in the pool of tables when a corresponding completion status is received and by retiring the certain entry when all descriptors of the same I/O issued earlier have received completion status.

9. A method comprising:
receiving I/O data corresponding to a plurality of I/O contexts via a plurality of lanes at a port coupled to a storage protocol engine;
the storage protocol engine requesting a direct memory access (DMA) Descriptor Manager (DM) to generate descriptors in response to receiving the I/O data; and
generating by the DM a plurality of completion lookup tables associated with the plurality of lanes, a first completion lookup table included in the plurality of lookup tables including:
a first entry indexed by a first input/output (I/O) Context Index (IOCI) associated with a first descriptor having a first set of I/O context fields to track first I/O data corresponding to a first I/O context received at a first lane of the plurality of lanes; and
a second completion lookup table included in the plurality of lookup tables including:
a second entry indexed by a second IOCI associated with a second descriptor having a second set of I/O context fields to track second I/O data corresponding to the first I/O context received via a second lane of the plurality of lanes.

10. The method of claim 9 further comprising the storage protocol engine supplying the DM with a corresponding IOCI and relevant I/O context fields for generating the first descriptor.

11. The method of claim 9 further comprising writing a work queue entry within a DMA engine after generating the first descriptor.

12. The method of claim 11 further comprising:
updating leading I/O context field values after the DM has completed generating the first descriptor and has written the work queue entry within DMA engine; and updating lagging I/O context field values upon the DM receiving a completion status from the DMA engine for the IOCI.

13. A system comprising:
a storage device; and
a host bus adapter (HBA) to receive data from the storage device via direct memory access (DMA), the HBA including:
a port having a plurality of lanes to receive I/O data corresponding to a plurality of I/O contexts;
a plurality of storage protocol engines to receive the data from the storage device, the plurality of storage protocol engines corresponding to the plurality of lanes; and
a DMA Descriptor Manager (DM) to generate and track execution of descriptors, the DM having a plurality of completion lookup tables associated with the plurality of lanes, a first completion lookup table included in the plurality of lookup tables including:
a first entry indexed by a first input/output (I/O) Context Index (IOCI) associated with a first descriptor having a first set of I/O context fields to track first I/O data corresponding to a first I/O context received at a first lane of the plurality of lanes; and
a second completion lookup table included in the plurality of lookup tables including:
a second entry indexed by a second IOCI associated with a second descriptor having a second set of I/O context fields to track second I/O data corresponding to the first I/O context received via a second lane of the plurality of lanes.

14. The system of claim 13 wherein each entry includes initial I/O read/write information.

15. The system of claim 14 wherein the first set of I/O context fields include one or more of a transfer count, relative offset within a buffer, pointer to a scatter/gather list and address length pair.

16. The system of claim 15 wherein the first completion lookup table enables updating of actual field values indexed with the first IOCI.

17. The system of claim 13 wherein the second completion lookup table includes a third entry to track third I/O data corresponding to a second I/O context received at the a second lane, the first and second I/O contexts being different from each other.

18. The system of claim 17 wherein the first and second completion lookup tables form a pool of tables that is shared to enable the DM to have access to I/O context fields for I/O received at both the first and the second lanes.

* * * * *

UNITED STATES PATENT AND TRADEMARK OFFICE
CERTIFICATE OF CORRECTION

PATENT NO. : 7,415,549 B2  Page 1 of 1
APPLICATION NO. : 11/237455
DATED : August 19, 2008
INVENTOR(S) : Vemula et al.

It is certified that error appears in the above-identified patent and that said Letters Patent is hereby corrected as shown below:

In column 6, line 2, in Claim 1, delete "Loci" and insert -- IOCI --, therefor.

In column 8, line 17, in Claim 17, after "the" delete "a".

Signed and Sealed this

Eighteenth Day of November, 2008

JON W. DUDAS
*Director of the United States Patent and Trademark Office*